(12) United States Patent
Hinque

(10) Patent No.: US 8,857,484 B2
(45) Date of Patent: *Oct. 14, 2014

(54) SELF-INFLATING TIRE

(75) Inventor: Daniel Paul Luc Marie Hinque, Habay-la-Neuve (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 310 days.

This patent is subject to a terminal disclaimer.

(21) Appl. No.: 13/221,231

(22) Filed: Aug. 30, 2011

(65) Prior Publication Data

US 2013/0048176 A1 Feb. 28, 2013

(51) Int. Cl.
*B60C 23/12* (2006.01)

(52) U.S. Cl.
CPC ...................... *B60C 23/12* (2013.01)
USPC ........................................... 152/426; 152/419

(58) Field of Classification Search
USPC ......................... 152/419, 423–426
See application file for complete search history.

(56) References Cited

U.S. PATENT DOCUMENTS

| | | | | |
|---|---|---|---|---|
| 638,628 | A * | 12/1899 | Everett et al. ................. | 152/425 |
| 1,050,886 | A * | 1/1913 | Wetherell ....................... | 152/426 |
| 1,134,361 | A * | 4/1915 | Wetherell ....................... | 152/426 |
| 2,095,489 | A | 10/1937 | Cotton | |
| 3,304,981 | A * | 2/1967 | Sheppard ....................... | 152/426 |
| 7,225,845 | B2 * | 6/2007 | Ellmann ........................ | 152/426 |
| 8,042,586 | B2 * | 10/2011 | Losey et al. ................... | 152/426 |
| 8,113,254 | B2 * | 2/2012 | Benedict ....................... | 152/426 |
| 8,156,978 | B1 * | 4/2012 | Hinque et al. ................. | 152/426 |
| 8,235,081 | B2 * | 8/2012 | Delgado et al. ............... | 152/419 |
| 8,291,950 | B2 * | 10/2012 | Hinque et al. ................. | 152/426 |
| 8,573,270 | B2 * | 11/2013 | Hinque .......................... | 152/426 |
| 2004/0112495 | A1 | 6/2004 | Weise | |
| 2011/0120611 | A1 | 5/2011 | Hansen | |
| 2012/0160386 | A1 * | 6/2012 | Hinque et al. ................. | 152/429 |
| 2012/0241063 | A1 * | 9/2012 | Hinque et al. ................. | 152/418 |
| 2012/0241064 | A1 * | 9/2012 | Hinque et al. ................. | 152/418 |
| 2013/0048178 | A1 * | 2/2013 | Hinque .......................... | 152/450 |
| 2013/0112328 | A1 * | 5/2013 | Hinque et al. ................. | 152/450 |
| 2013/0112329 | A1 * | 5/2013 | Hinque et al. ................. | 152/450 |

FOREIGN PATENT DOCUMENTS

| | | |
|---|---|---|
| DE | 102005031099 | 1/2007 |
| EP | 1604842 | 12/2005 |
| FR | 2318747 | 2/1977 |
| WO | 2007134556 | 11/2007 |

* cited by examiner

*Primary Examiner* — Jason Bellinger
(74) *Attorney, Agent, or Firm* — June E. Rickey

(57) ABSTRACT

A self-inflating tire assembly includes an air tube connected to a tire and defining an air passageway, the air tube being composed of a flexible material operative to allow an air tube segment opposite a tire footprint to flatten, closing the passageway, and resiliently unflatten into an original configuration. The air tube is sequentially flattened by the tire footprint in a direction opposite to a tire direction of rotation to pump air along the passageway to an inlet device for exhaust from the passageway or to an outlet device for direction into the tire cavity. The inlet device is positioned within the annular passageway 180 degrees opposite the outlet device such that sequential flattening of the air tube by the tire footprint effects pumping of air along the air passageway with the tire rotating in either a forward or reverse direction of rotation. The invention further includes an inlet device for regulating the inlet flow of the air tube pump.

8 Claims, 16 Drawing Sheets

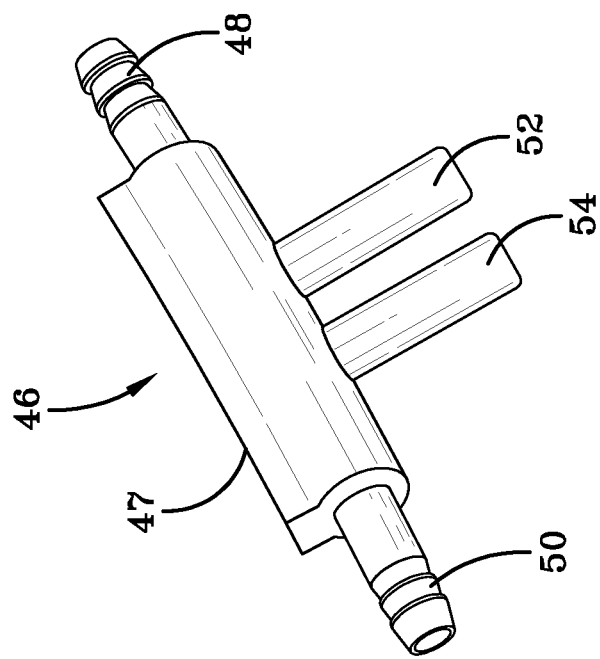
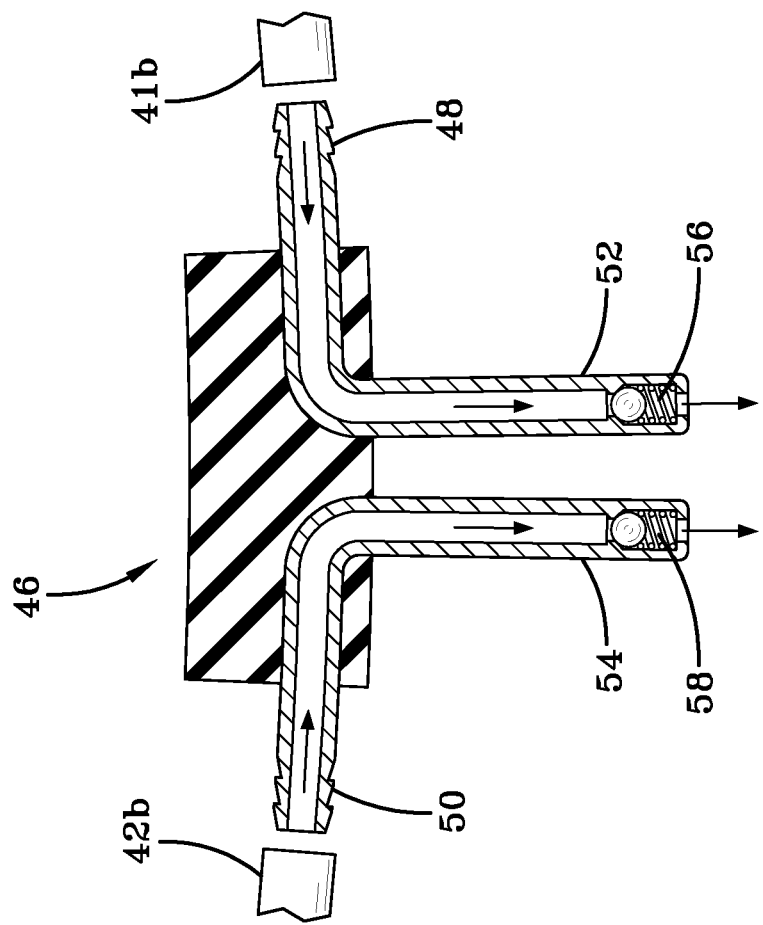

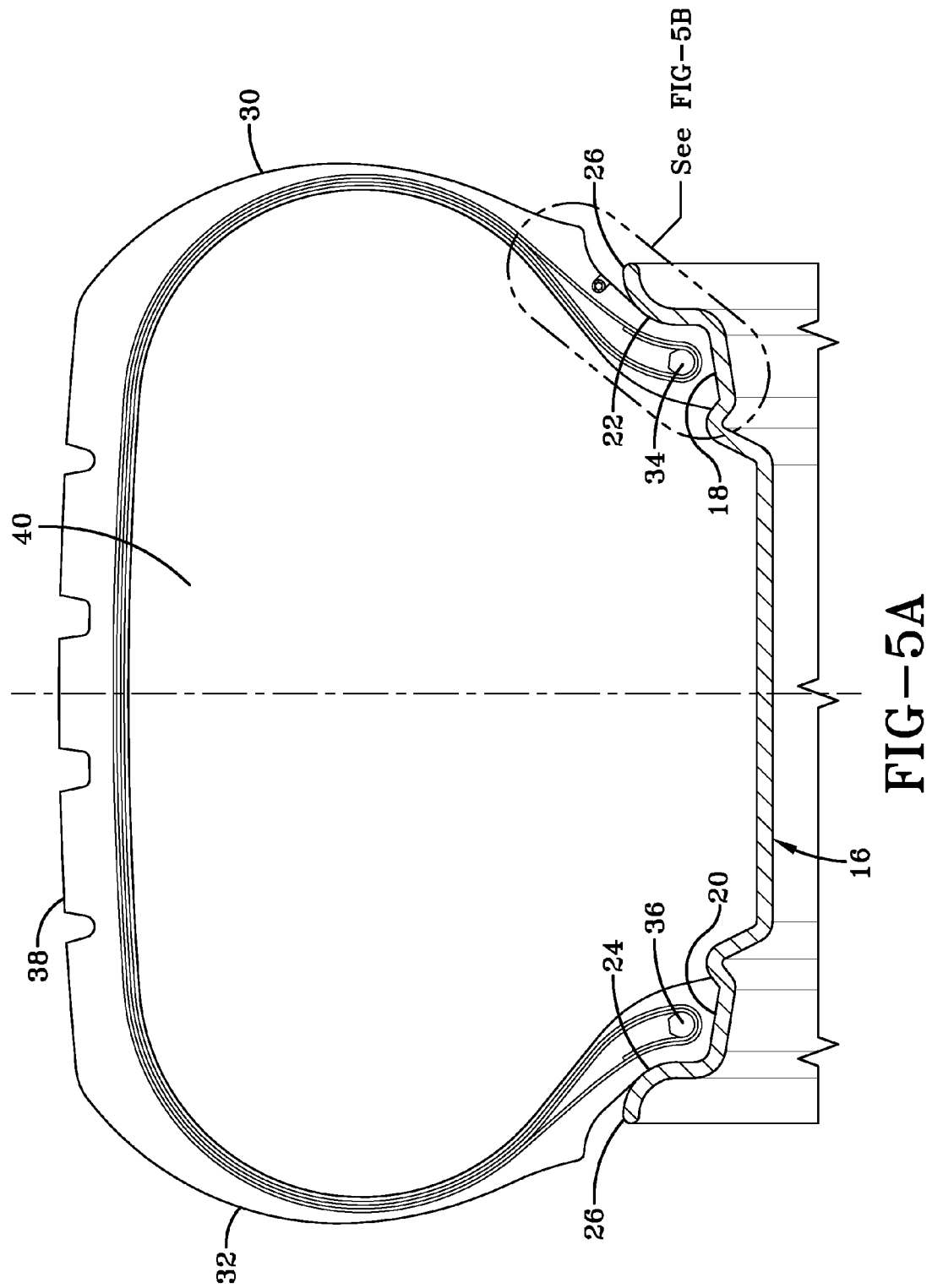

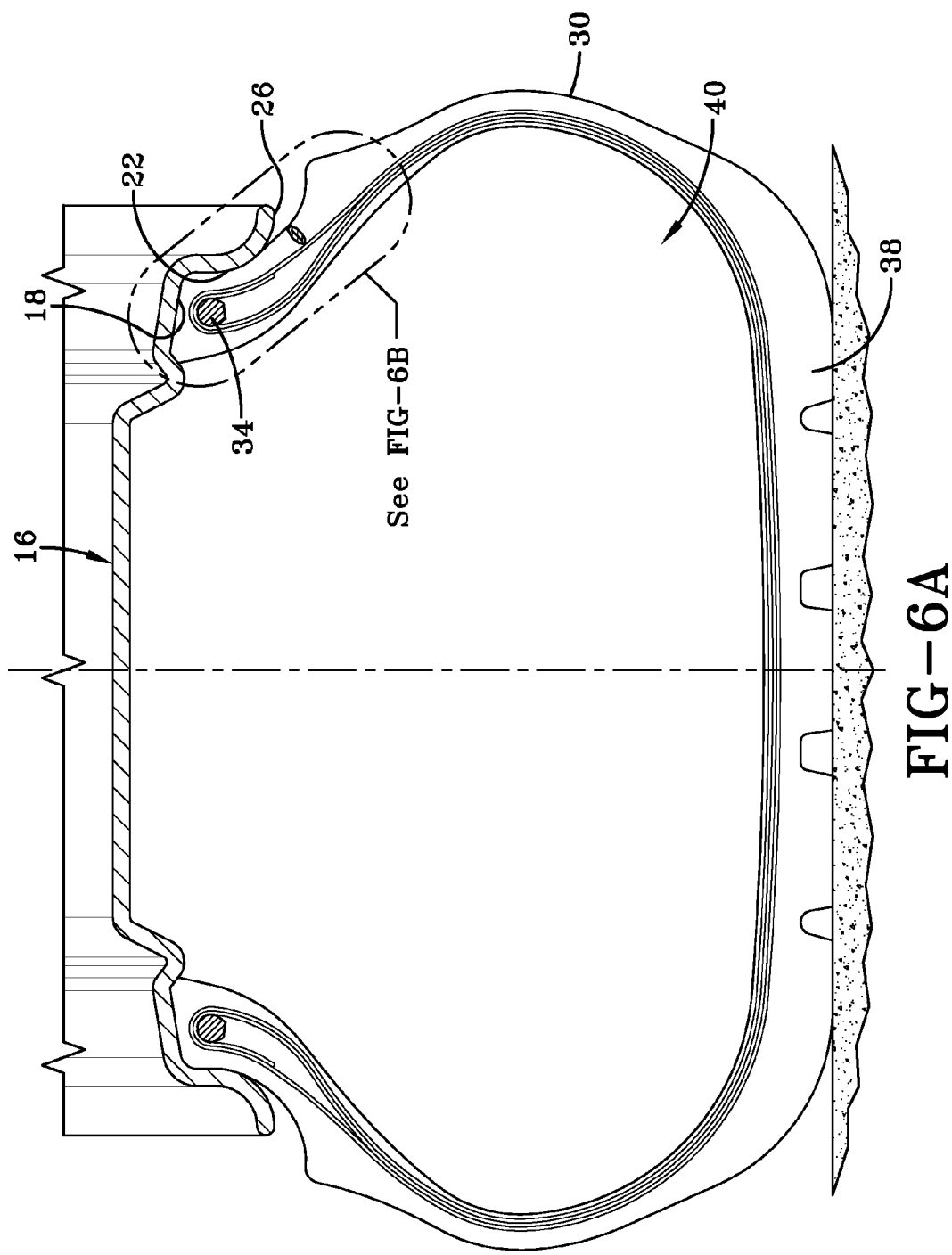

SELF-INFLATING TIRE

FIELD OF THE INVENTION

The invention relates generally to self-inflating tires and, more specifically, to a pump mechanism for such tires.

BACKGROUND OF THE INVENTION

Normal air diffusion reduces tire pressure over time. The natural state of tires is under inflated. Accordingly, drivers must repeatedly act to maintain tire pressures or they will see reduced fuel economy, tire life and reduced vehicle braking and handling performance. Tire Pressure Monitoring Systems have been proposed to warn drivers when tire pressure is significantly low. Such systems, however, remain dependant upon the driver taking remedial action when warned to re-inflate a tire to recommended pressure. It is a desirable, therefore, to incorporate a self-inflating feature within a tire that will self-inflate the tire in order to compensate for any reduction in tire pressure over time without the need for driver intervention.

SUMMARY OF THE INVENTION

The invention provides in a first aspect a self-inflating tire assembly including a tire mounted to a rim, the tire having a tire cavity, first and second sidewalls extending respectively from first and second tire bead regions to a tire tread region. An air tube is connected to the tire and defines an air passageway. The air tube is composed of a flexible material operative to allow a portion of the air tube segment near a tire footprint to substantially close the annular passageway. An inlet regulator device is connected to an inlet end of the air tube, and includes an insert mounted in the tire, wherein the insert has a bore therethrough having a first end located in the tire cavity, and a second end which extends through the tire. A pressure membrane is received within the first end of the insert, and a regulator body is received within the second end the insert, wherein the regulator body has a interior passageway which extends from a first end to a distal end, wherein the distal end extends into a cavity of the insert, and the pressure membrane is responsive to the cavity tire pressure and the outside air pressure. The pressure membrane is positioned for engagement with the distal end of the regulator body when the tire pressure reaches a set value for opening and closing the regulator to allow or prevent flow from entering the regulator device.

The invention provides in a second aspect a self-inflating tire assembly having a tire mounted to a rim, the tire having a tire cavity, first and second sidewalls extending respectively from first and second tire bead regions to a tire tread region. A first and second air tube is connected to the tire, wherein each air tube defines an air passageway. Each air tube is composed of a flexible material operative to allow a portion of the air tube segment near a tire footprint to substantially open and close the annular passageway. An inlet regulator device is connected to an inlet end of each air tube and includes a regulator body mounted in the tire sidewall. The regulator body has an outer duct having a distal end located within the tire cavity, wherein the duct has an internal bore that is in fluid communication with the tire cavity and an internal chamber of the regulator body. The internal chamber is connected to two opposed passageways in the regulator body that are further connected to an inlet end of the first and second air tubes. A pressure membrane is mounted within the internal chamber of the regulator body. An insert is mounted within the internal chamber of the regulator body and has a flanged end that surrounds an internal cavity. The flanged end is engageable with the pressure membrane and can seal the flanged end from flow. The insert has an upper surface having one or more air holes that extend from the upper surface and are in fluid communication with the internal cavity, said insert further comprising two transverse conduits that are in fluid communication with the internal cavity.

Definitions

"Aspect ratio" of the tire means the ratio of its section height (SH) to its section width (SW) multiplied by 100 percent for expression as a percentage. "Asymmetric tread" means a tread that has a tread pattern not symmetrical about the center plane or equatorial plane EP of the tire.

"Axial" and "axially" means lines or directions that are parallel to the axis of rotation of the tire.

"Chafer" is a narrow strip of material placed around the outside of a tire bead to protect the cord plies from wearing and cutting against the rim and distribute the flexing above the rim.

"Circumferential" means lines or directions extending along the perimeter of the surface of the annular tread perpendicular to the axial direction.

"Equatorial Centerplane (CP)" means the plane perpendicular to the tire's axis of rotation and passing through the center of the tread.

"Footprint" means the contact patch or area of contact of the tire tread with a flat surface at zero speed and under normal load and pressure.

"Inboard side" means the side of the tire nearest the vehicle when the tire is mounted on a wheel and the wheel is mounted on the vehicle.

"Lateral" means an axial direction.

"Lateral edges" means a line tangent to the axially outermost tread contact patch or footprint as measured under normal load and tire inflation, the lines being parallel to the equatorial centerplane.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Peristaltic" means operating by means of wave-like contractions that propel contained matter, such as air, along tubular pathways.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Tread element" or "traction element" means a rib or a block element defined by having shape adjacent grooves.

"Tread Arc Width" means the arc length of the tread as measured between the lateral edges of the tread.

BRIEF DESCRIPTION OF THE DRAWINGS

The invention will be described by way of example and with reference to the accompanying drawings in which:

FIG. 3A is an enlarged perspective view of the pump outlet mechanism.

FIG. 3B is a cross-sectional view of the pump outlet mechanism of FIG. 3A.

FIG. 5A is a partial section view through the tire.

FIG. 6A is a partial section view through the tire under load at road surface.

DETAILED DESCRIPTION OF THE INVENTION

Figure 1:
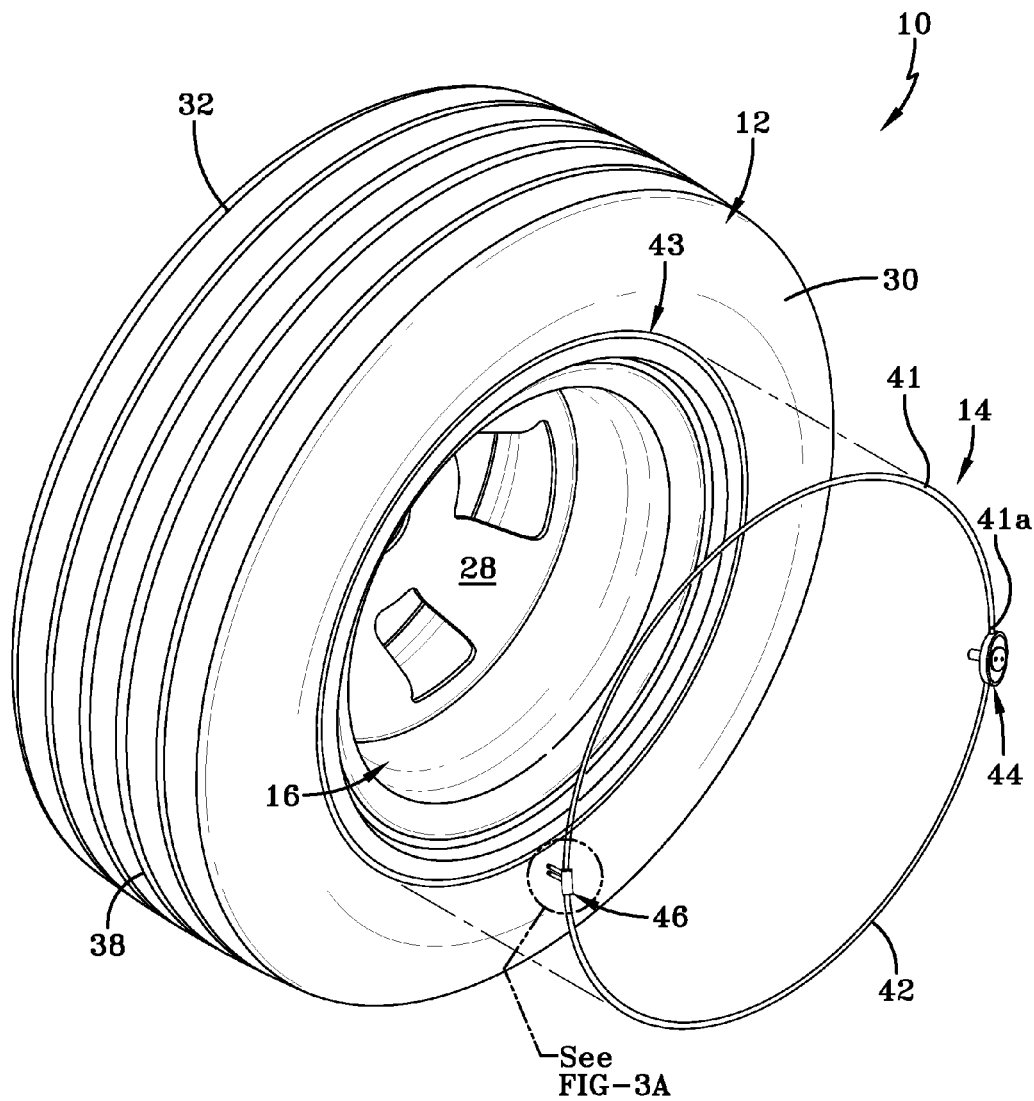
FIG. 1 is an isometric view of a tire and wheel assembly showing two peristaltic pump assemblies.
Figure 5B:
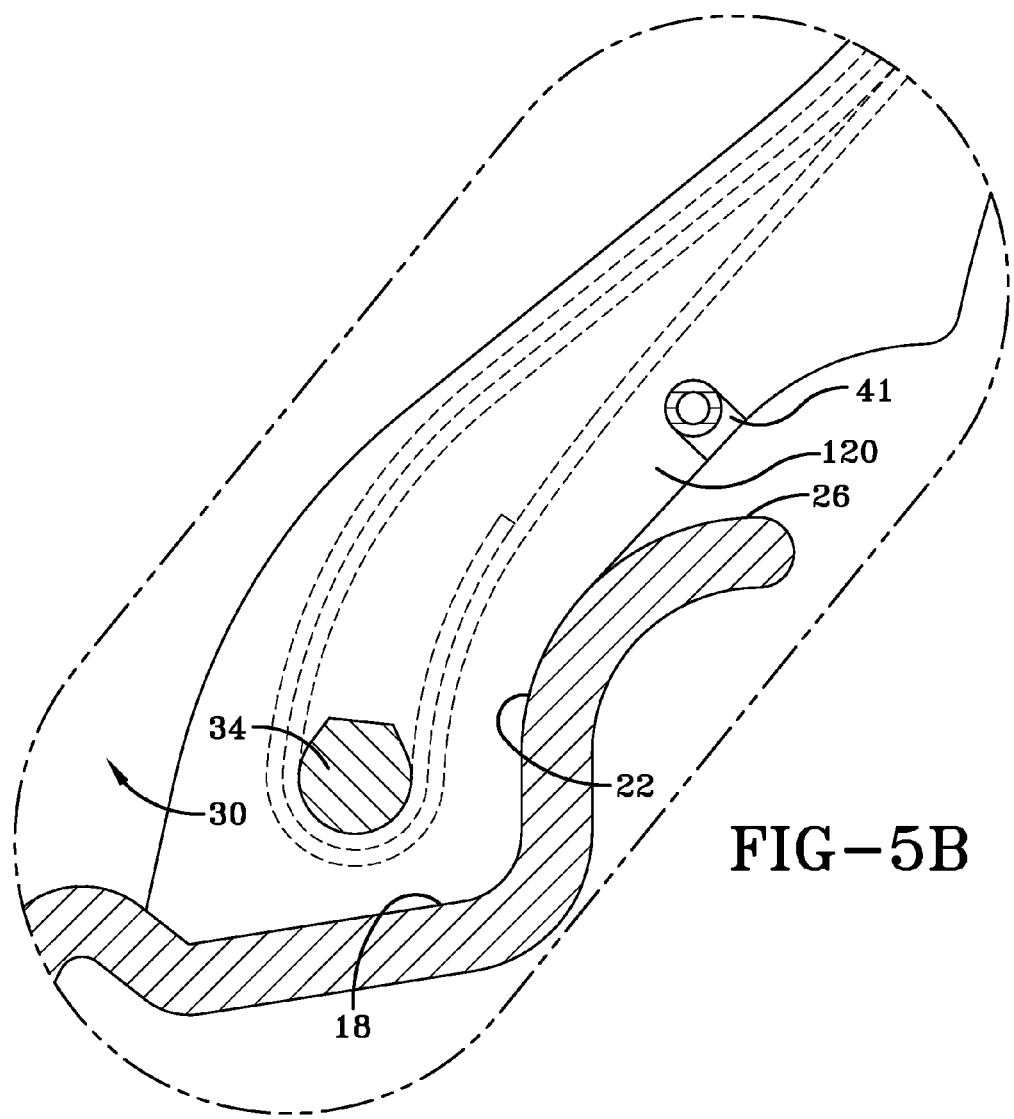
FIG. 5B is an enlarged view of pump tube location next to the wheel.

Referring to FIGS. 1 and 5, a tire assembly 10 includes a tire 12, a peristaltic pump assembly 14, and a tire wheel 16. The tire mounts in a conventional fashion to a wheel having a pair of rim mounting surfaces 18, 20 located adjacent outer rim flanges 22,24. The outer rim flanges 22,24 have an outer rim surface 26. A rim body 28 supports the tire assembly as shown. The tire is of conventional construction, having a pair of sidewalls 30,32 extending from opposite bead areas 34,36 to a crown or tire read region 38. The tire and rim body enclose a tire cavity 40.

Figure 2:
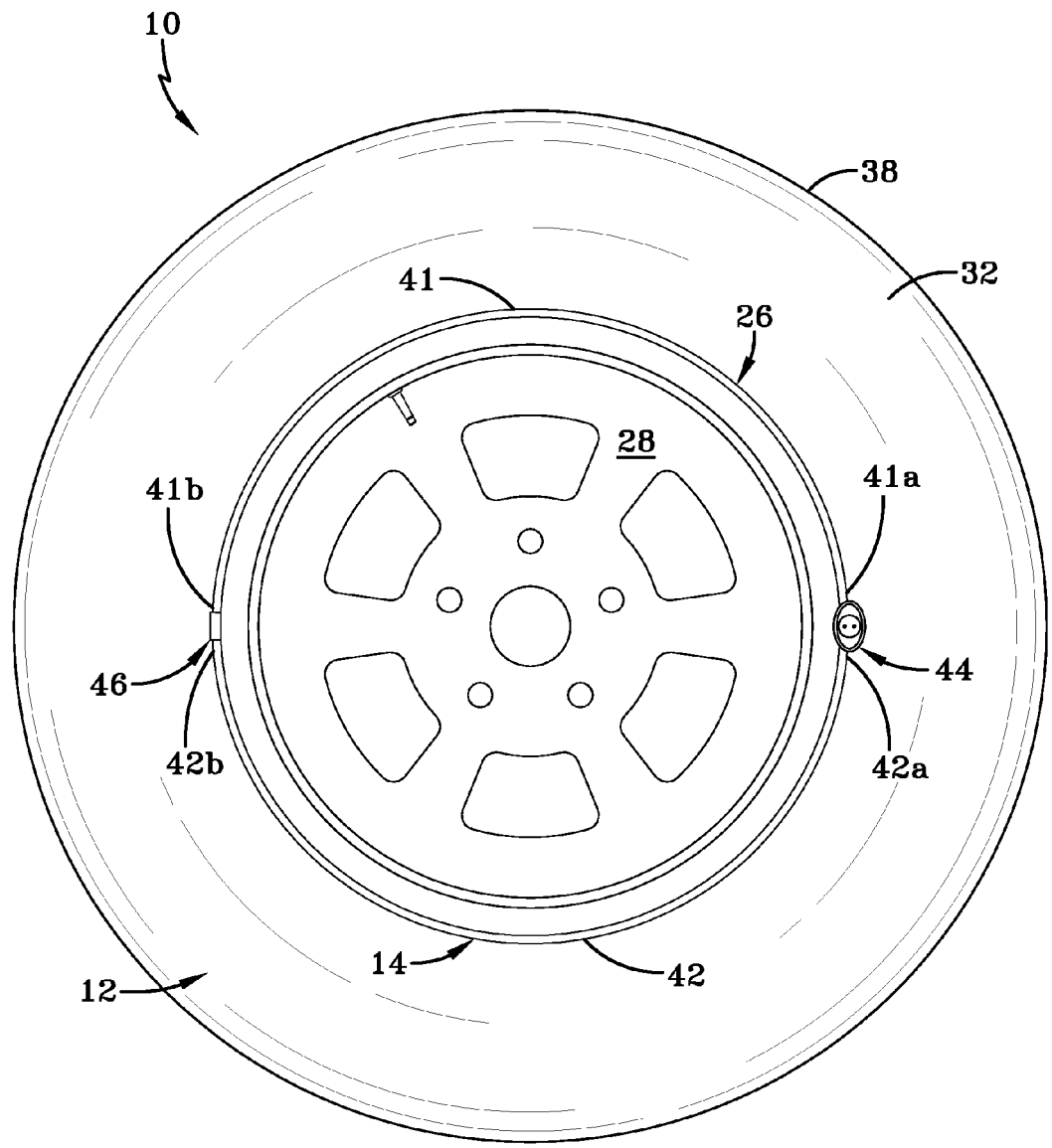
FIG. 2 is a side view of the tire of FIG. 1.

As shown in FIGS. 1, 2 and 4, the peristaltic pump assembly 14 includes a first and second pump 41,42 that are mounted in a passageway 43 located in the sidewall area of the tire, preferably near the bead region. The air passageway is preferably molded into the sidewall of the tire during vulcanization and is preferably annular in shape. Each pump 41,42 has a first end 41a,42a joined together by an inlet device 44 and a second end 41b,42b joined together by an outlet device 46. Each pump 41,42 is comprised of a tube formed of a resilient, flexible material such as plastic, silicone, elastomer or rubber compounds, and is capable of withstanding repeated deformation cycles when the tube is deformed into a flattened condition subject to external force and, upon removal of such force, returns to an original condition generally circular in cross-section. The tube is of a diameter sufficient to operatively pass a volume of air sufficient for the purposes described herein and allowing a positioning of the tube in an operable location within the tire assembly as will be described. Preferably, the tube has a circular cross-sectional shape, although other shapes such as elliptical or lens shape may be utilized.

As shown, the inlet device 44 and the outlet device 46 are spaced apart approximately 180 degrees at respective locations forming two 180 degree pumps 41,42. The inlet and outlet device may be located adjacent each other, thus forming a single 360 degree pump. Other variations may be utilized, such as 270 degrees, etc. The outlet device 46 is a connector having a body 47 having a first port 48 that connects to pump 41 outlet end 41b. The first port 48 is in fluid communication with outlet port 52. Outlet port 52 extends into the tire cavity so that the pump end 41b is in fluid communication with the tire cavity. The outlet device further includes a second port 50 that connects to pump 42 outlet end 42b. The second port 50 is connected to an outlet port 54 that is located in the tire cavity so that the pump end 42 is in fluid communication with the tire cavity. FIG. 3B further illustrates that each outlet end 52,54 may further comprise a check valve 56,58 to prevent backflow of air into the pump. The outlet ends 52,54 of the outlet device 46 extend into the tire cavity so that the outlet ends are in fluid communication with the internal tire cavity 40.

The inlet device 44 is shown in FIGS. 8-15. The inlet device functions to regulate the inlet flow of both pumps 41,42. The inlet device 44 includes an outer cover 45 that may be molded into a green tire and then cured. The cover 45 has two lateral holes 47 for fluid communication with the inlet of the pump tubes 41,42 as described in more detail, below. The cover further comprises an inner cavity 50 formed by sidewalls 51 and bottom wall 52. A hole 53 is located in bottom wall.

A regulator body 54 is received within the inner cavity 50 of the cover. The regulator body 54 has an outer duct 56 having a first end 57 which is connected to the regulator body and a distal end 59 that is received within the hole 53 of the inner cavity 50. The outer duct is sized to have a sufficient length so that the distal end 59 of the duct is in fluid communication with the tire cavity 40. The first end 57 of the outer duct 56 is connected to an internal chamber 58 that is preferably centrally located within the regulator body 54. The internal chamber 58 has two opposed holes 60 leading to two opposed passageways 62. The passageways 62 are positionable for alignment with holes 47 located in cover 45.

A pressure membrane 64 is received within the bottom of the chamber 58 and is supported by a rim 65 about the chamber wall 66. The pressure membrane is preferably disk shaped and formed of a flexible material such as, but not limited to, rubber, elastomer, plastic or silicone.

An insert 68 is positioned in the chamber 58 over the pressure membrane 64. The insert 68 has an upper flanged surface 70 having one or more air holes 74 that extend from the upper surface 70 and down through the insert body 72, so that the outside air is in fluid communication with the pressure membrane 64. The air holes may optionally include a filter 80. The insert 68 has an internal cavity 76 that is in fluid communication with the pressure membrane 64, the air holes 74, and two transverse conduits 78 that are transverse or perpendicular to the air holes 74. The transverse conduits and connected to either side of the internal cavity 76. The internal cavity is surrounded by a flanged portion 77 which may be annular in shape and is positioned for engagement with the pressure membrane.

Figure 13A:
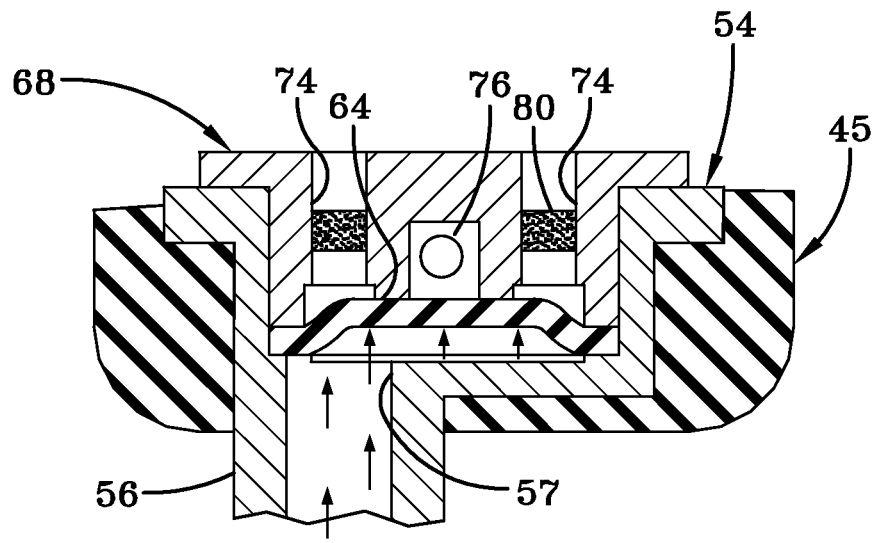
FIG. 13A is a cross-sectional view of the pressure regulator of FIG. 8 taken along lines 12-12, and shown in the closed position.
Figure 13B:
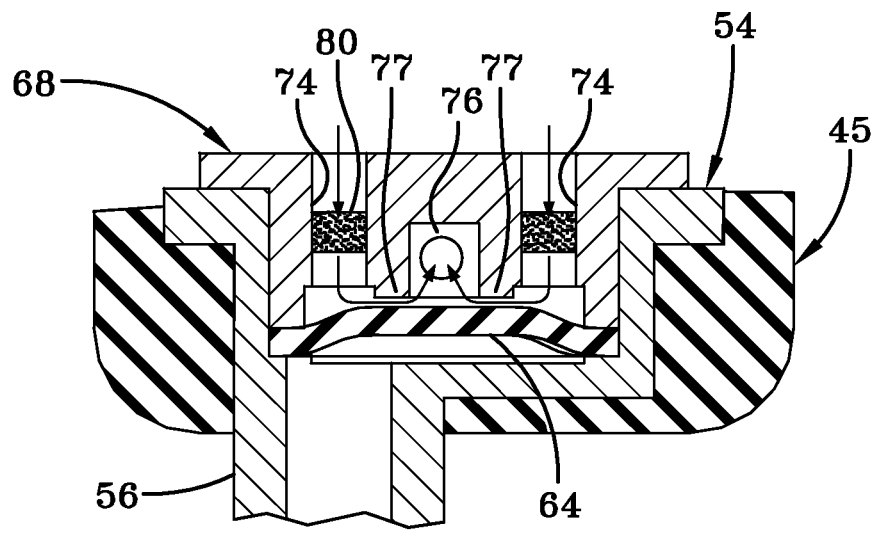
FIG. 13B is a cross-sectional view of the pressure regulator of FIG. 8 taken along lines 12-12, and shown in the open position.
Figure 14:
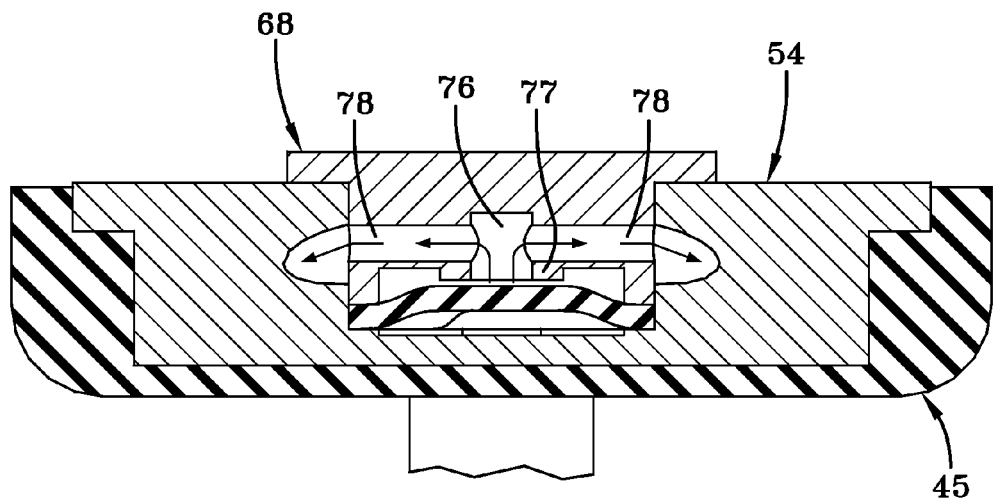
FIG. 14 is a cross-sectional view of the pressure regulator of FIG. 8 taken along lines 11-11.
Figure 15:
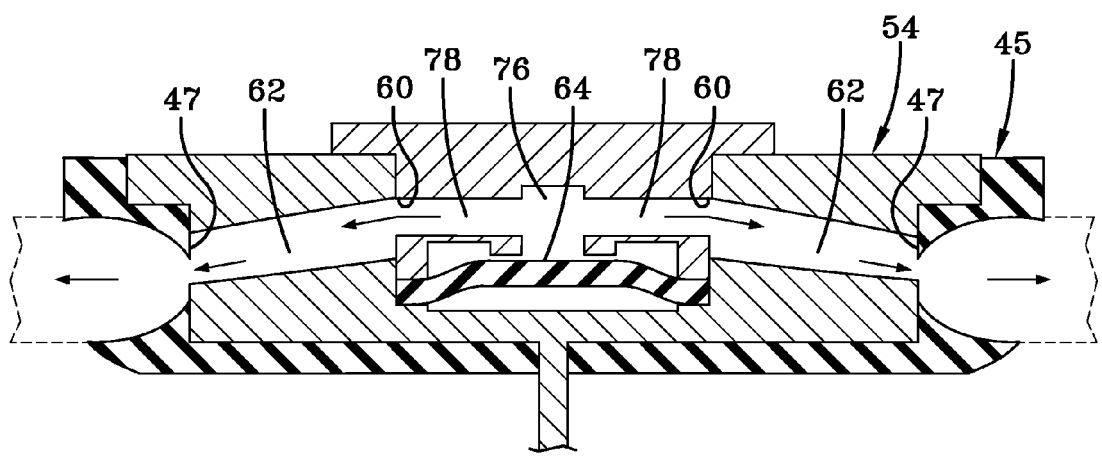
FIG. 15 is a cross-sectional view of the pressure regulator of FIG. 9 taken along lines 15-15.

The operation of the inlet pressure regulator device 44 may now be described. The pressure membrane senses the pressure in the tire cavity via the pressure in duct 56 which is in fluid communication with the tire cavity. When the tire pressure is sufficiently high, the pressure membrane is responsive to the tire pressure, and if the pressure is sufficiently high, the pressure membrane is forced into engagement with the flanged portion of the internal body and sealing the internal cavity 76 by the pressure membrane as shown in FIG. 13A. The pressure membrane seats against the flanged portion 77 of the internal body 68 shutting off the flow to the cavity 76. As the tire pressure decreases, the pressure membrane unseats from the flanged portion 77 as shown in FIG. 13b, and air may flow into the air holes 74, and into cavity 76. As shown in FIG. 15, the air from the cavity enters the transverse conduits 78 and then through the opposed chamber passageways 62, and then through the aligned holes 47 of the outer cover 45 and then into the inlet ends of the respective pumps 41,42.

Figure 4A:
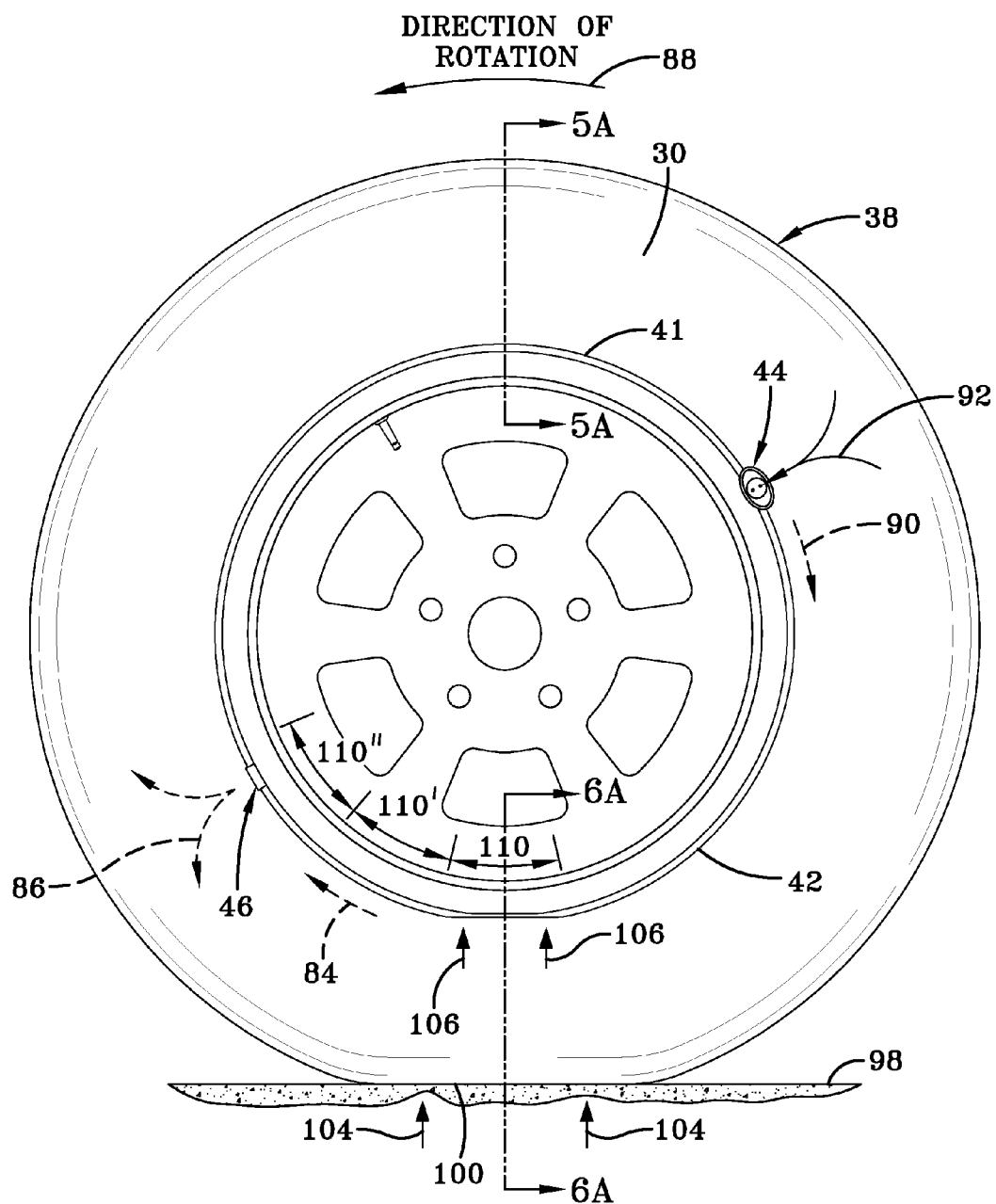
FIGS. 4A and 4B illustrate side views of the tire, wheel, tubing, and valves showing operation of the pump to the tire cavity when the tire rotates.

As will be appreciated from FIG. 4A, the inlet device 44 and the outlet device 46 are in fluid communication with the circular air tube 42 and positioned generally 180 degrees apart. As the tire rotates in a direction of rotation 88, a footprint 100 is formed against the ground surface 98. A compressive force 104 is directed into the tire from the footprint 100 and acts to flatten segment by segment 110,110',110" of the pump 42 as shown at numeral 106. Flattening of the segment 110,110',110" of the pump 42 forces a portion of air located between the flattened segment 110,110',110" and the outlet device 46, in the direction shown by arrow 84 towards the outlet device 46.

As the tire continues to rotate in direction 88 along the ground surface 98, the pump tube 42 will be sequentially flattened or squeezed segment by segment in a direction 90 which is opposite to the direction of tire rotation 88. The sequential flattening of the pump tube 42 segment by segment causes the column of air located between the flattened segments to and the outlet device 46 be pumped in the direction 84 within pump 42 to the outlet device 46.

With the tire rotating in direction 88, flattened tube segments are sequentially refilled by air 92 flowing into the inlet device 44 along the pump tube 42 in the direction 90 as shown by FIG. 4A. The inflow of air from the inlet device 44 in direction 90 continues until the outlet device 46, rotating counterclockwise as shown with the tire rotation 88, passes the tire footprint.100.

Figure 4B:
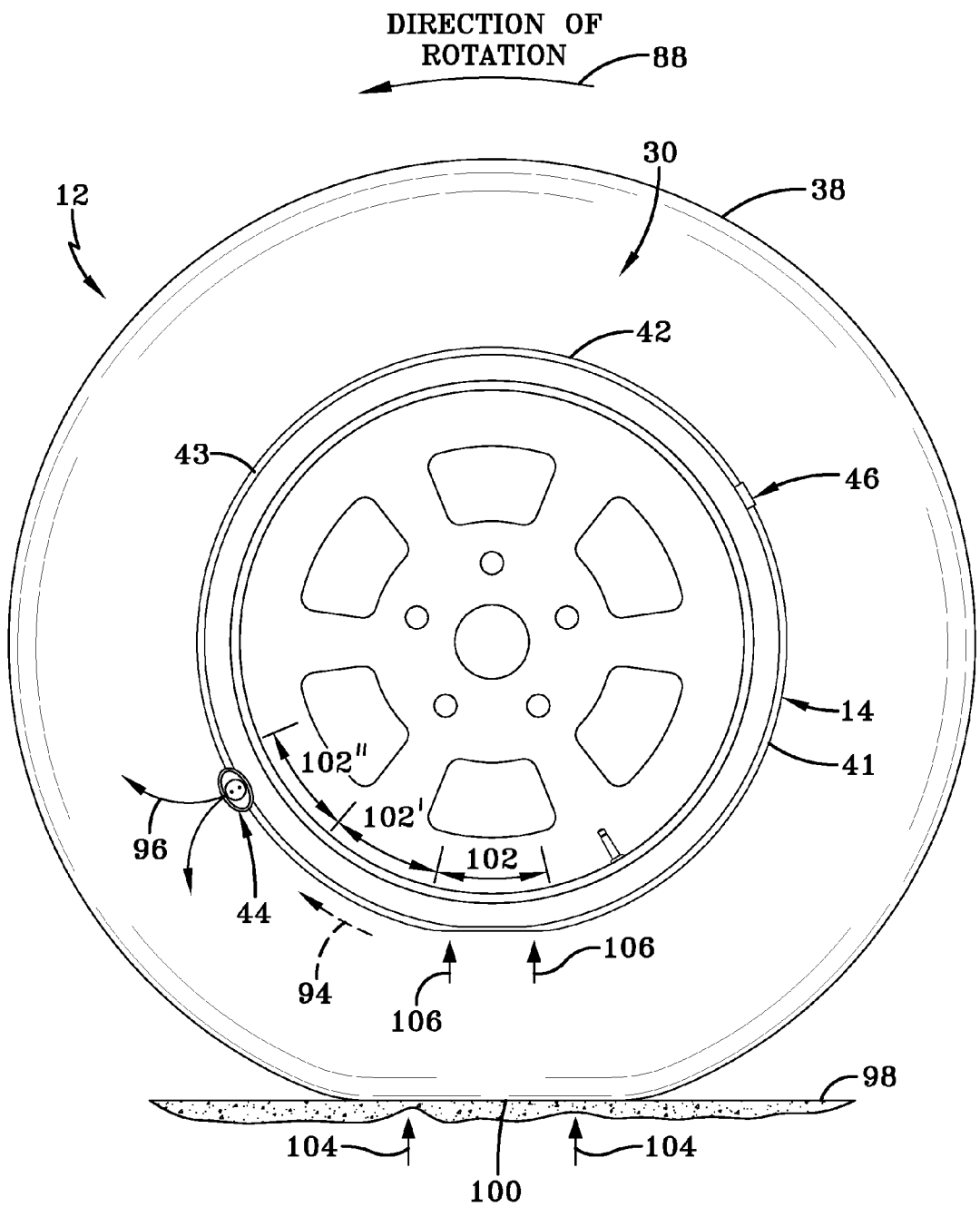

FIG. 4B shows the orientation of the peristaltic pump assembly 14 in such a position. In the position shown, the tube 41 continues to be sequentially flattened segment by segment opposite the tire footprint by compressive force 104 as shown at numeral 106. Air is pumped in the clockwise direction 94 to the inlet device 44 where it is evacuated or exhausted. Passage of exhaust air 96 from the inlet device 44 is through the internal filter 80 which acts to self-clean the filter of accumulated debris or particles within the porous medium. With the evacuation of pumped air out of the inlet device 44, the outlet device is in the closed position and air does not flow therefrom to the tire cavity. When the tire rotates further in counter-clockwise direction 88 until the inlet device 44 passes the tire footprint 100 (as shown in FIG. 4A), the airflow resumes to the outlet device 46 causing the pumped air to flow out (86) to the tire cavity 40.

FIG. 4B illustrates that the tube 42 is flattened segment by segment 102,102',102" as the tire rotates in direction 88.

Accordingly, the progression of squeezed or flattened tube segments can be seen to move in a clockwise direction, counter to the tire rotation in direction 88. As segment 102 moves away from the footprint 100, the compression forces within the tire from the footprint region are eliminated and the segment 102 is free to resiliently reconfigure into an unflattened state as segment 102 refills with air from passageway 43. In the original unflattened configuration segments of the tube 42 are generally circular in section.

The above-described cycle is then repeated for each tire revolution, half of each rotation resulting in pumped air going to the tire cavity and half of the rotation the pumped air is directed back out the inlet device to self-clean the filter. It will be appreciated that while the direction of rotation 88 of the tire 12 is shown in FIGS. 4A and 4B to be counterclockwise, the subject tire assembly and its peristaltic pump assembly 14 will function in like manner in a (clockwise) reverse direction of rotation to that shown at numeral 88. The peristaltic pump is accordingly bi-directional and equally functional with the tire assembly moving in a forward or a reverse direction of rotation.

Figure 6B:
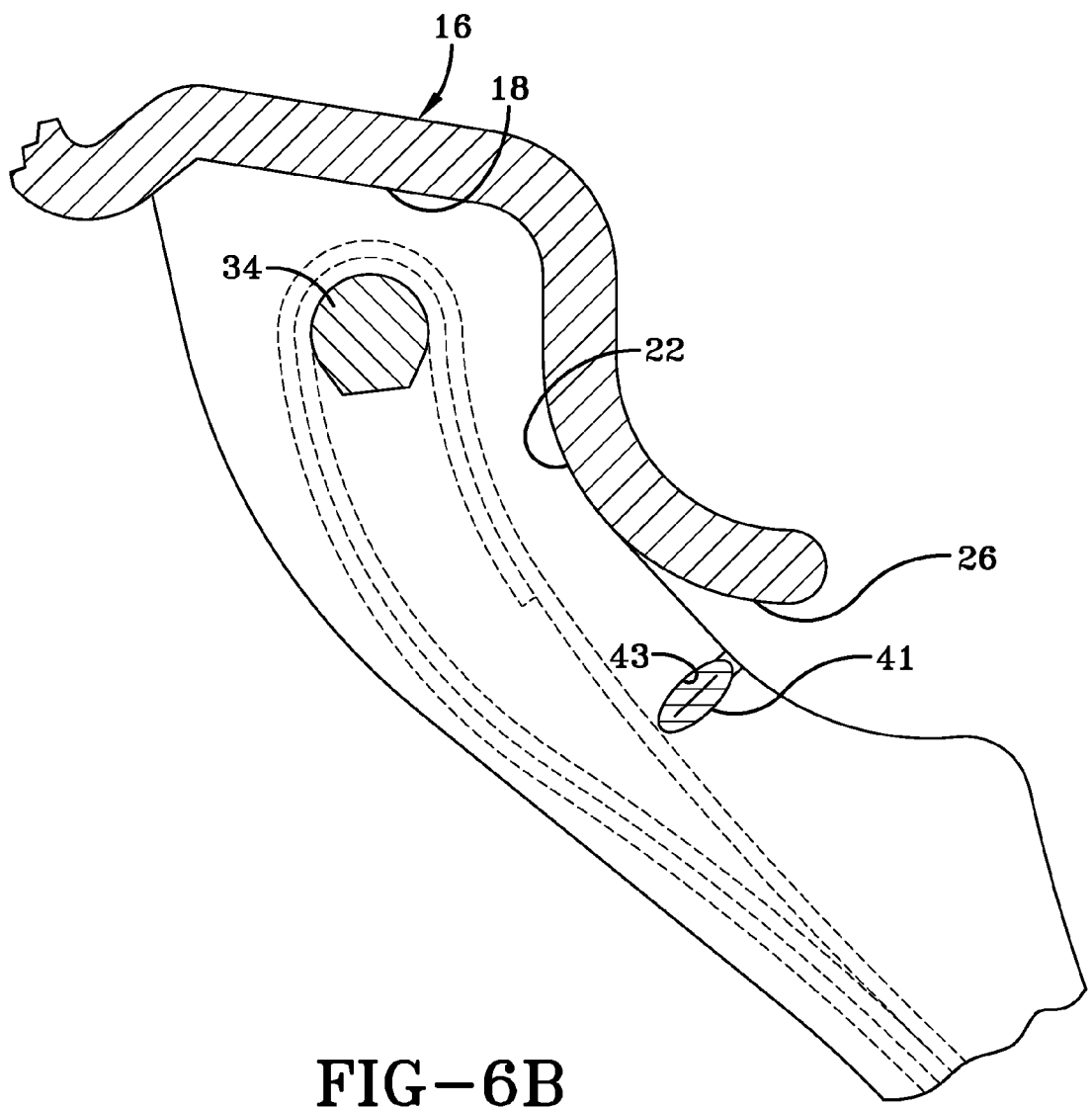
FIG. 6B is an enlarged view of FIG. 6A illustrating the tube being compressed in the tire bead area.
Figure 7:
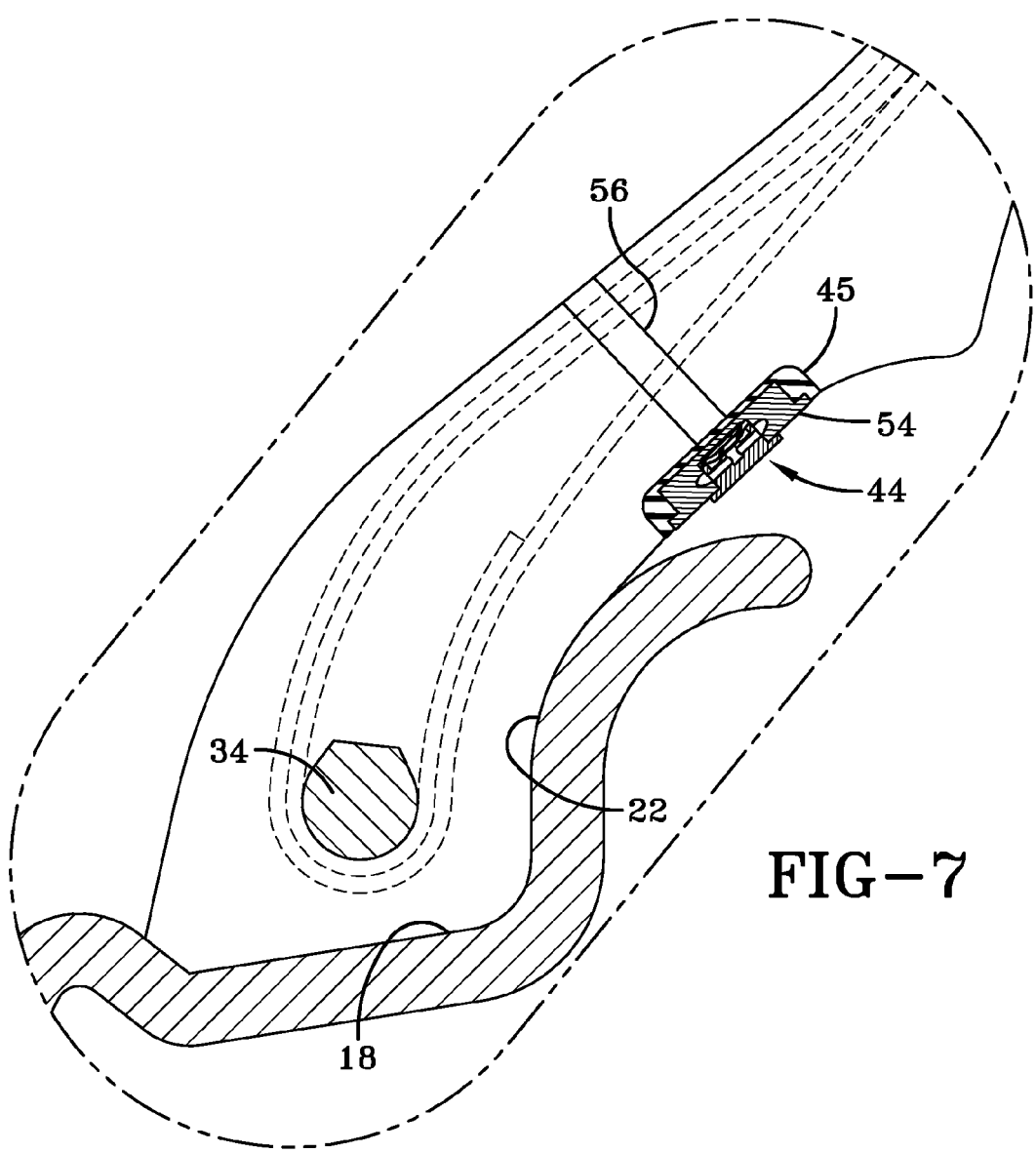
FIG. 7 is an enlarged cross sectional view of the tire and wheel assembly with the pressure regulator shown mounted in the tire.
Figure 8:
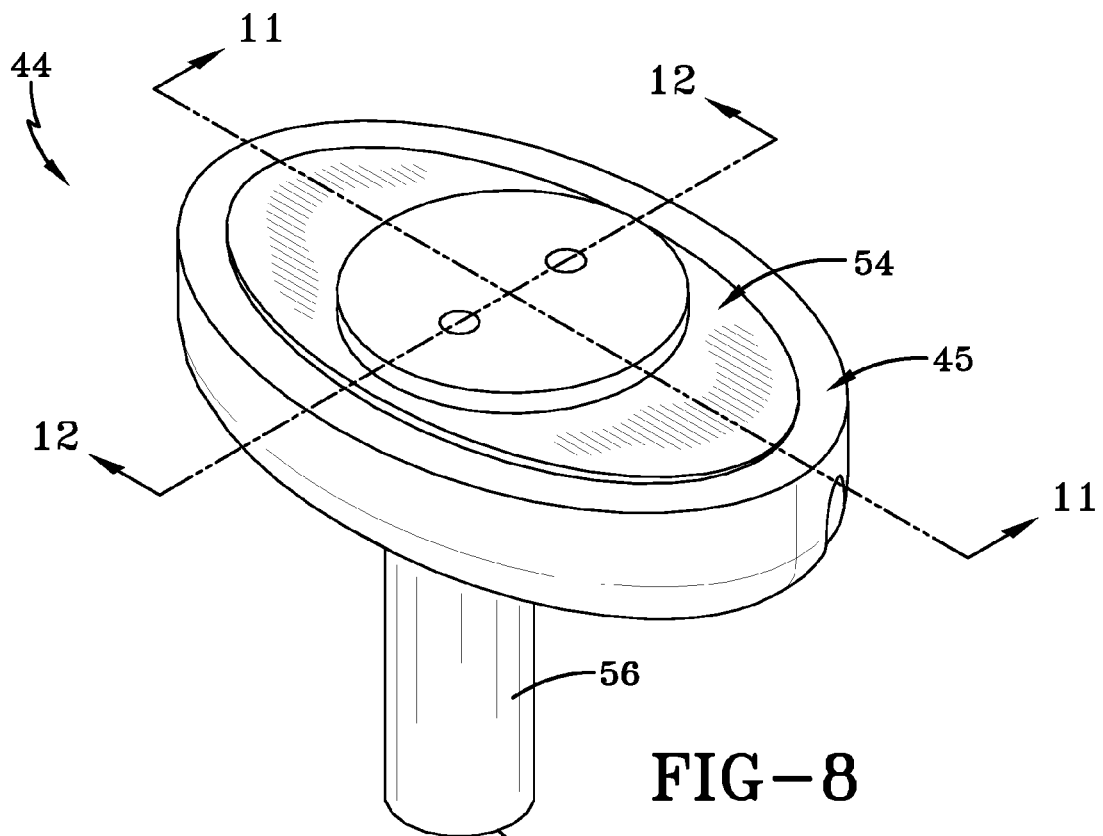
FIG. 8 is a perspective view of a pressure regulator.
Figure 9:
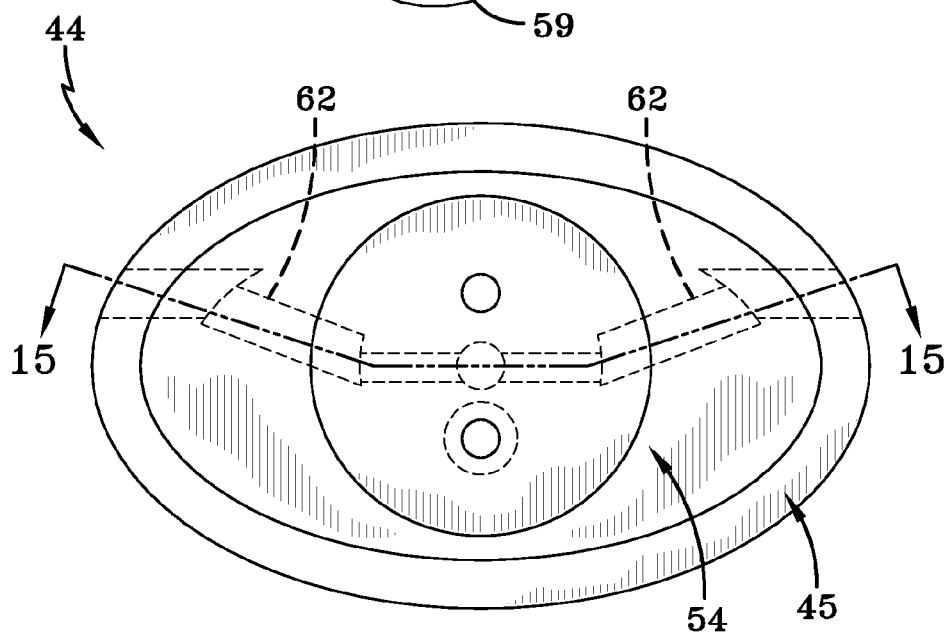
FIG. 9 is a top view of the pressure regulator of FIG. 8.
Figure 10:
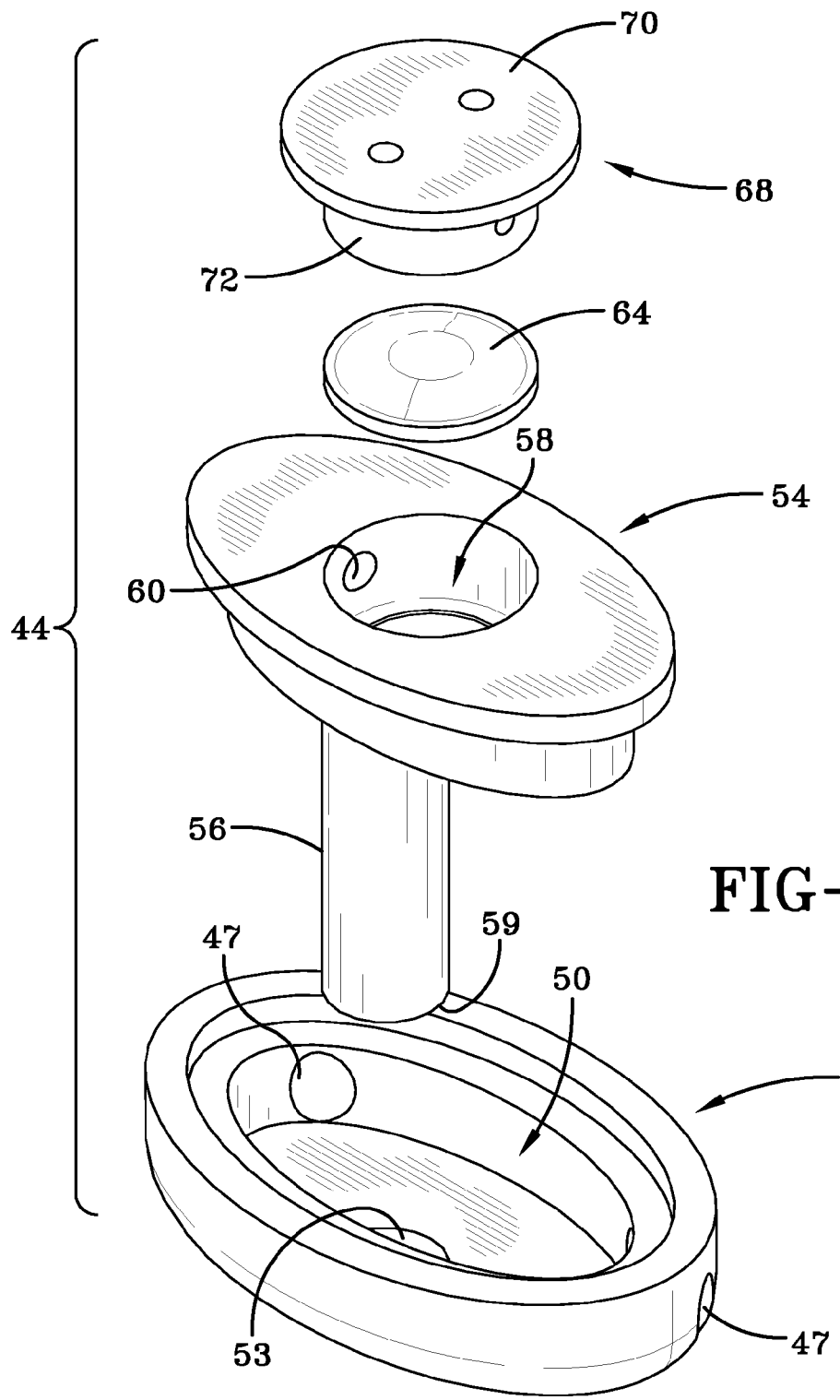
FIG. 10 is an exploded perspective view of the pressure regulator of FIG. 8.
Figure 11:
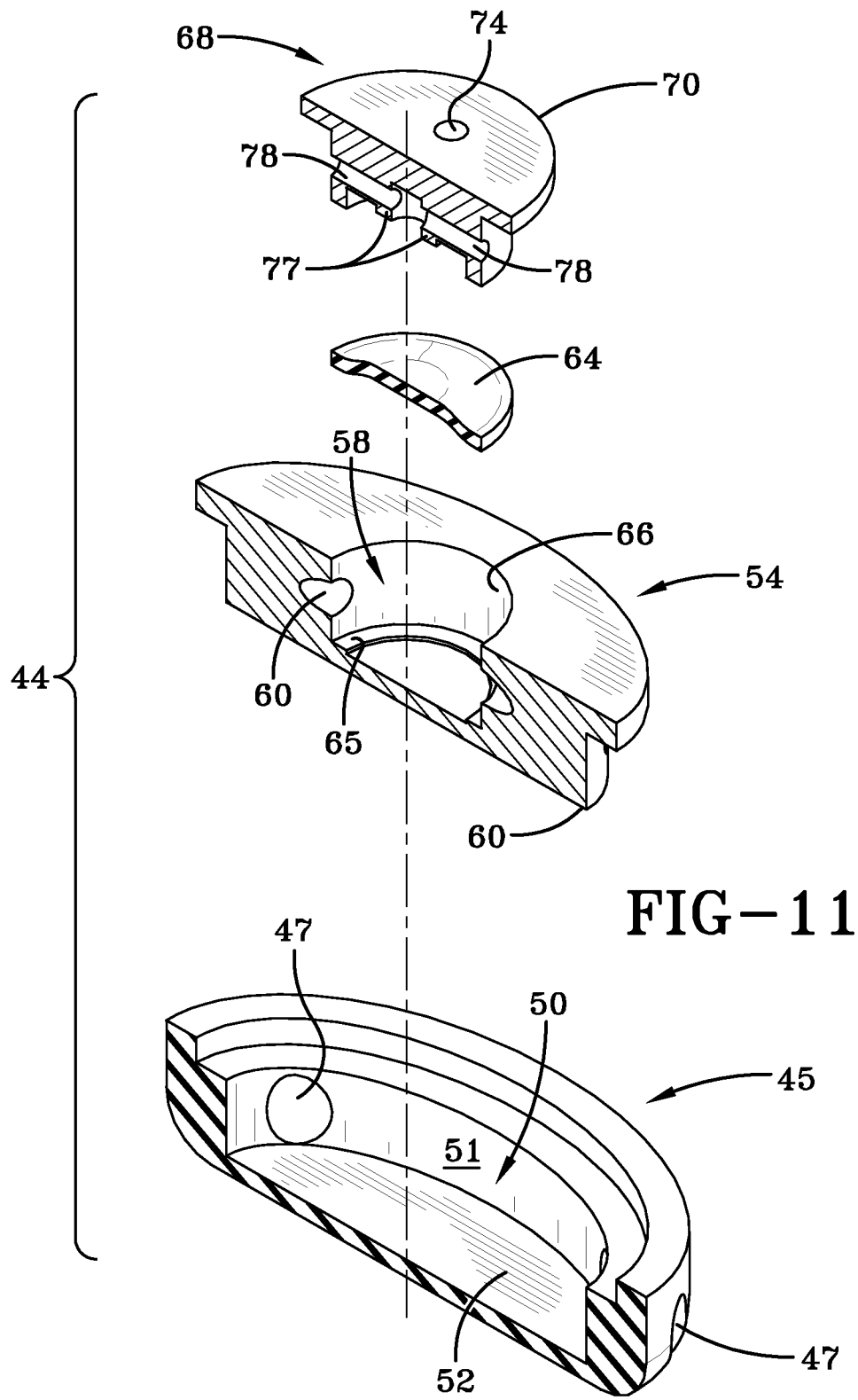
FIG. 11 is an exploded cross-sectional view of the pressure regulator of FIG. 8 taken along lines 11-11.
Figure 12:
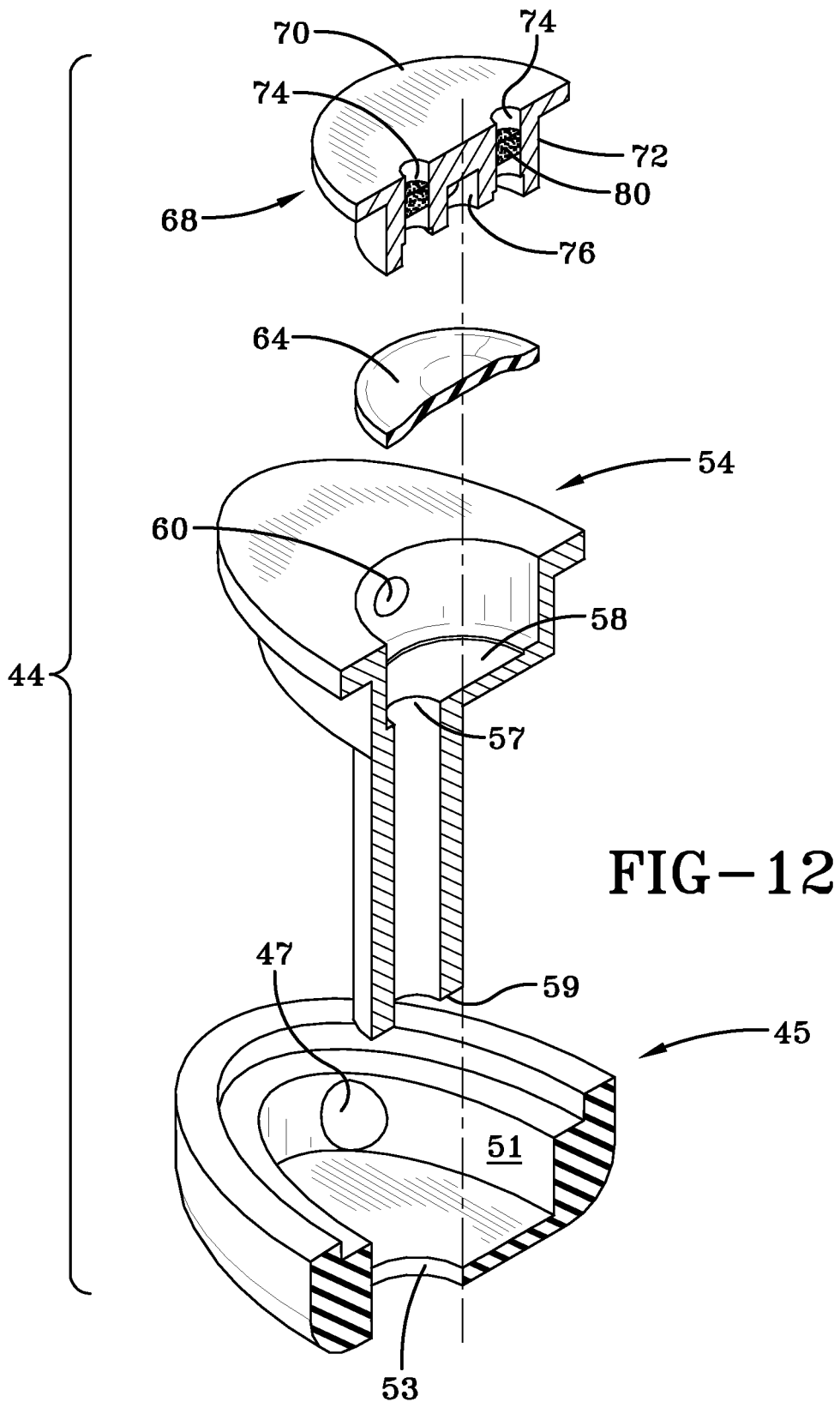
FIG. 12 is an exploded cross-sectional view of the pressure regulator of FIG. 8 taken along lines 12-12.

The location of the peristaltic pump assembly will be understood from FIGS. 5-6. In one embodiment, the peristaltic pump assembly 14 is positioned in the tire sidewall, radially outward of the rim flange surface 26 in the chafer 120. So positioned, the air tube 42 is radially inward from the tire footprint 100 and is thus positioned to be flattened by forces directed from the tire footprint as described above. The segment 110 that is opposite the footprint 100 will flatten from the compressive force 114 from the footprint 100 pressing the tube segment against the rim flange surface 26. Although the positioning of the tube 42 is specifically shown as between a chafer 120 of the tire at the bead region 34 and the rim surface 26, it is not limited to same, and may be located at any region of the tire such as anywhere in the sidewall or tread. The diametric sizing of the peristaltic pump air tube 42 is selected to span the circumference of the rim flange surface 26.

From the forgoing, it will be appreciated that the subject invention provides a bi-directionally peristaltic pump for a self-inflating tire in which a circular air tube 42 flattens segment by segment and closes in the tire footprint 100. The air inlet T-device 44 may include a filter 80 and be self-cleaning. The peristaltic pump assembly 14 pumps air under rotation of the tire in either direction, one half of a revolution pumping air to the tire cavity 40 and the other half of a revolution pumping air back out of the inlet device 44 (filter 80). The peristaltic pump assembly 14 may be used with a secondary tire pressure monitoring system (TPMS) (not shown) of conventional configuration that serves as a system fault detector. The TPMS may be used to detect any fault in the self-inflation system of the tire assembly and alert the user of such a condition.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A self-inflating tire assembly comprising:
 a tire mounted to a rim, the tire having a tire cavity, first and second sidewalls extending respectively from first and second tire bead regions to a tire tread region;

a first and second air tube connected to the tire, wherein each air tube defines an air passageway, each air tube being composed of a flexible material operative to allow a portion of the air tube segment to substantially open and close the annular passageway, an inlet regulator device connected to an inlet end of each air tube, the inlet regulator device includes a regulator body mounted in the tire sidewall, the regulator body having an outer duct having a distal end located within the tire cavity, wherein the duct has an internal bore that is in fluid communication with the tire cavity and an internal chamber of the regulator body; the internal chamber being connected to two opposed passageways in the regulator body that are connected to an inlet end of the first and second air tubes, a pressure membrane mounted within the internal chamber of the regulator body;

an insert mounted within the internal chamber of the regulator body and having a flanged end engageable with the pressure membrane, wherein the flanged end surrounds an internal cavity, the insert has an upper surface having one or more air holes that are in fluid communication with the internal cavity, said insert further comprising two transverse conduits that are in fluid communication with the internal cavity.

2. The self-inflating tire assembly of claim 1 wherein the inlet regulator device forms an outer face flush with the outer surface of the tire.

3. The self-inflating tire assembly of claim 1 wherein the inlet regulator device is mounted in the sidewall of the tire.

4. The tire assembly of claim 1, wherein the air tube is sequentially flattened by the tire footprint to pump air along the air passageway in either a forward tire direction of rotation or a reverse tire direction of rotation.

5. The tire assembly of claim 1, wherein the outlet device and the inlet regulator device are mounted to the annular air tube substantially 180 degrees apart.

6. The tire assembly of claim 1, wherein the cross-sectional shape of the air tube is elliptical.

7. The tire assembly of claim 1, wherein the air tube is positioned between a tire bead region and a rim flange radially inward of the tire tread region.

8. A self-inflating tire assembly comprising:

a tire mounted to a rim, the tire having a tire cavity, first and second sidewalls extending respectively from first and second tire bead regions to a tire tread region;

a first and second air tube connected to the tire, wherein each air tube defines an air passageway, each air tube being composed of a flexible material operative to allow a portion of the air tube segment to substantially open and close the annular passageway, an inlet regulator device mounted in the tire, the inlet regulator device having an outer duct having a distal end located within the tire cavity, wherein the duct has an internal bore that is in fluid communication with the tire cavity and an internal chamber of the inlet regulator device; the internal chamber being connected to two opposed passageways in the regulator body that are connected to an inlet end of the first and second air tubes, a pressure membrane mounted within the internal chamber of the inlet regulator device;

a wall of the internal chamber having a flanged end engageable with the pressure membrane, wherein the flanged end surrounds an internal cavity, the inlet regulator device having an upper surface having one or more air holes that are in fluid communication with the internal cavity, said insert further comprising two transverse conduits that are in fluid communication with the internal cavity.

\* \* \* \* \*